United States Patent

Klein

[15] 3,705,651

[45] Dec. 12, 1972

[54] FILTER SYSTEM EMPLOYING ACTIVATED CARBON, POROUS MATERIAL AND DIATOMACEOUS EARTH

[72] Inventor: Samuel H. Klein, 2240 Halifax Drive, Apt. 1011, Ottawa, Ontario, Canada

[22] Filed: Sept. 10, 1971

[21] Appl. No.: 179,332

[52] U.S. Cl. .................................. 210/266, 210/282
[51] Int. Cl. ........................................... B01d 27/02
[58] Field of Search......210/266, 282, 283, 284, 315, 210/317

[56] References Cited

UNITED STATES PATENTS

| | | | |
|---|---|---|---|
| 1,629,269 | 5/1927 | Hagg | 210/282 |
| 3,219,191 | 11/1965 | Suchy | 210/282 X |
| 3,439,809 | 4/1969 | McPherren | 210/282 X |
| 3,520,417 | 7/1970 | Durr et al. | 210/282 X |
| 3,561,602 | 2/1971 | Molitor | 210/266 |

*Primary Examiner*—Samih N. Zaharna
*Attorney*—Peter Kirby et al.

[57] ABSTRACT

A disposable filter unit for consumer potable water consists of an inner core filled with activated carbon and surrounded by a body of porous material (fiber glass or asbestos) impregnated with diatomaceous earth. An outer layer of diatomaceous earth is formed on the porous material. The direction of water flow is inwardly through the outer materials to the core so that the carbon is arranged downstream of the other filtering materials.

5 Claims, 3 Drawing Figures

PATENTED DEC 12 1972

3,705,651

FILTER SYSTEM EMPLOYING ACTIVATED CARBON, POROUS MATERIAL AND DIATOMACEOUS EARTH

This invention relates to an improved filter purification system for use with a water supply. In one example, it is concerned with a so-called polishing filter, i.e. a filter that is used after the conventional filtering plant of a typical municipal water supply to furnish an additional degree of purity for potable water.

Investigations have shown that the water supplies of major cities today, even after having been through a normal water treatment plant, contain many pollutants that are potentially detrimental to the health of those who drink the water as well as other pollutants that are undesirable from the viewpoint of taste and smell.

The pollutants fall mainly into three types:

A. Materials in solution (e.g. insecticides, pesticides and antibiotics; detergents; phenols, lignins and tannins; chlorine compounds; sulphur compounds including sulphur dioxide and hydrogen sulphide; phosphates; benzidine (which is considered to be a potential cancer-forming compound); micropollutants (lead, cyanides, radionuclides, chlorinated hydrocarbons and organic phosphorus pesticides); mutagenic chemicals; and antagonistic (allergy forming) substances.

B. Residual solids, i.e. materials not in solution, but in suspension or in colloidal form (e.g. hydrated oxides of iron, manganese and aluminum; metallic iron and manganese in colloidal form; rust and scale; phosphates and ionized chemicals).

C. Live organisms, such as bacteria, algae and viruses.

It is not intended to suggest that all these pollutants will necessarily appear in any chosen water sample, but rather that these pollutants or their equivalents are each found from time to time in the typical water supplies of towns and cities in North America and probably in many other parts of the world. It follows that an ideal polishing filter should be so constructed as to be able to eliminate or at least to reduce the amount of typical pollutants of each of these three major types from water that is destined for drinking or food preparation purposes.

It is the object of the present invention to provide a filter system of this capability. Other objects will appear from the description that follows, which description explains one form of filter by way of example only of the invention, and not by way of limitation of the broad scope thereof, such scope being defined in the appended claims. The description that follows should be read in conjunction with the accompanying drawings, in which:

Figure 1:
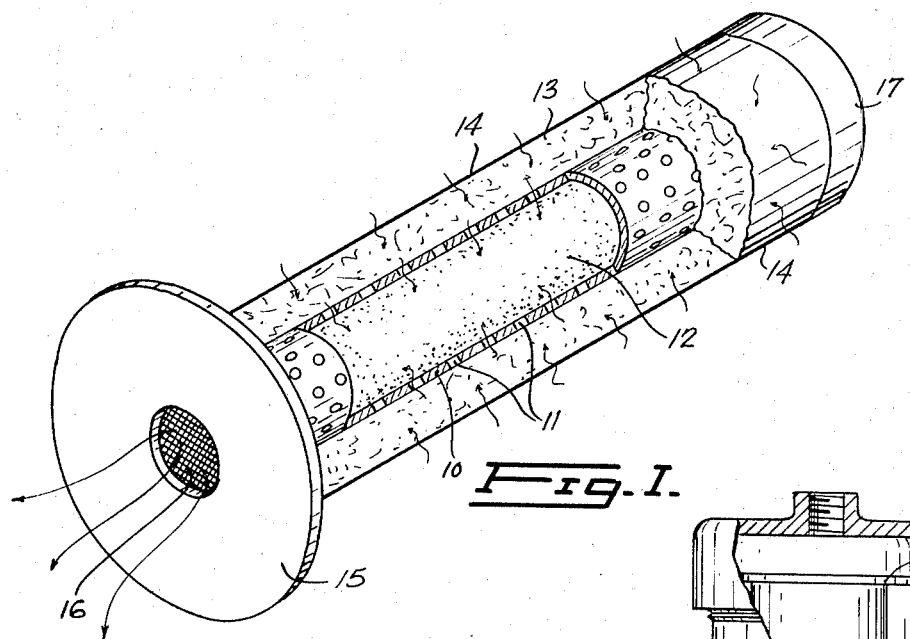
FIG. 1 is a cut-away side perspective view of a filter device.

The filter device shown in FIG. 1 consists of an elongate, central core 10 of stainless steel, perforated by holes 11 and filled with a body of activated carbon 12. Surrounding the core 10 is a cylindrical body 13 of porous mineral material, such as fiber glass or asbestos, impregnated with diatomaceous earth. At the outside of the body 13 is a thin layer 14 of diatomaceous earth. A fine grade of diatomaceous earth is used.

At one end the core 10 is fixed to a stainless steel or polypropylene flange 15, in the center of which there is a stainless steel strainer 16 communicating with the interior of the core 10. The flange 15 is attached to the body 13 by means of epoxy, preventing the circulation of water between the flange 15 and the body 13. At the other end of the unit, a urethane cap 17 surrounds the end of the body 13 of mineral material and is secured thereto by epoxy or other durable fixing means.

Figure 2:
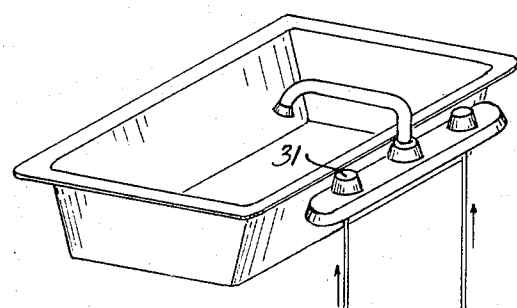
FIG. 2 is a cut-away side view of the filter device mounted in a casing to form a filter unit.

As shown in FIG. 2, this filter device, now collectively designated 20, is mounted by its flange 15 in a cylindrical, water tight housing 21 preferably formed of a tough plastic material, but alternatively, of stainless steel. The housing 21 is closed by a cap 22, and the whole assembly so formed constitutes a filter unit referred to collectively as a unit 23.

Figure 3:
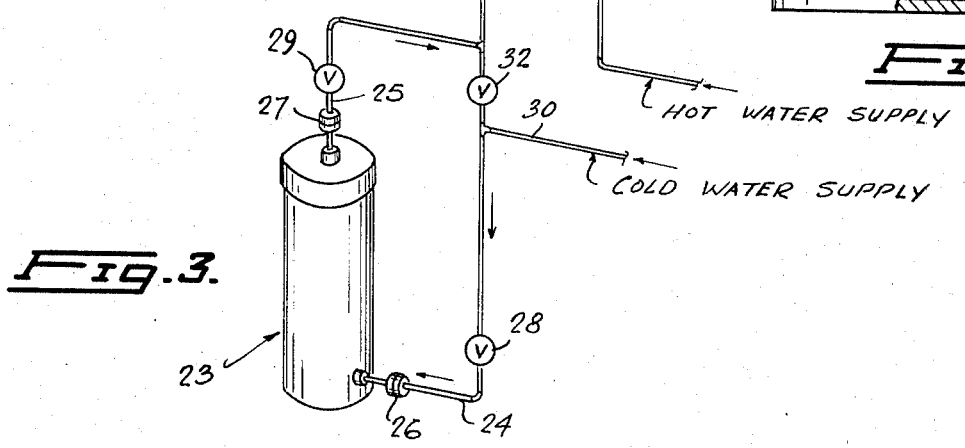
FIG. 3 is a view showing a manner of mounting such a unit beneath a kitchen sink or lavatory.

When the unit 23 is installed beneath a sink or lavatory, as shown in FIG. 3, inlet and outlet pipes 24, 25 having joints 26, 27 respectively connect the lower and upper ends of the interior of the unit 23 through valves 28, 29, to the cold water supply 30 and the cold faucet 31. The normal connection between these parts is fitted with a valve 32 which is closed when the valves 28, 29 are open, and vice versa. In this way the cold water supply, which will be used for drinking water, is diverted through the filter unit 23.

It will be noted that the manner of mounting the filter device in the unit ensures that the water flows through the filter device in a generally radially inward direction. It is essential to the success of the present invention that the incoming water flow first through the diatomaceous earth before flowing through the activated carbon. In other words, the activated carbon must be located downstream of the diatomaceous earth.

The primary effect of the diatomaceous earth is to trap at least some of the residual solids and especially the live organisms, e.g. bacteria, in the incoming water. A body of material of substantial depth, i.e. the material 13, impregnated with diatomaceous earth, is necessary in order to ensure sufficient contact between the diatomaceous earth and the flowing water, which latter must find its way through the many tortuous paths defined within the material 13. While bacteria will collect to some extent within the body of material 13, most of the bacteria are trapped at the layer 14 of diatomaceous earth, and here quickly build up an outer "bio" layer. The bacteria multiply in this bio layer and begin to feed off and derive nourishment from the residual solids and the materials in solution, i.e. some of the pollutants A and B above, both in the freshly incoming water and also in the water making its way through the material 13.

It is important that this action take place upstream of the activated carbon to maintain the activated carbon substantially free of bacteria and residual solids. The function of the activated carbon is primarily to adsorb organic and micropollution materials in solution, i.e. many of the pollutants of type A that are not acted upon by the bio layer. The ability of the activated carbon to properly fulfill this function is reduced if it is exposed to any appreciable degree of blockage to the incoming organisms and residual solids; hence the need to locate the activated carbon downstream of the diatomaceous earth and mineral material.

Theoretically at least, the physical arrangement of the layers could be reversed, i.e. with the activated carbon on the outside, in which case the water flow would have to take place in an outward direction, instead of inwardly.

It will be noted that all the materials used in the filter unit: stainless steel; polypropylene; urethane; activated carbon; the fiber glass or asbestos impregnated layer; and the diatomaceous earth itself, are chemically inert to water, in the sense that they will not dissolve in it.

It is to be observed that the manner of mounting the unit 23 facilitates its use as a self-contained disposable unit capable of ready removal and replacement by a new one. The householder or serviceman has merely to close the valves 28, 29 temporarily and disconnect the joints 26, 27, to replace a whole new unit 23, the filter device 20 itself being protected at this time from contamination.

While the example shows the filter unit mounted beneath a domestic sink installation, it will be appreciated that it may be mounted in any other location, domestic, commercial, municipal or industrial where there is a need to furnish a polishing filtering to a normal water supply to improve the safety and taste of the water for drinking purposes. In the matter of taste, it may be mentioned that the bacteria that multiply in the bio layer liberate some carbon dioxide which gives the water a slightly carbonated effect, which is pleasant to the taste.

I claim:

1. A filter purification system for potable water comprising
   a. a body of activated carbon for adsorption of organic materials in solution in the water,
   b. a body of porous material chemically inert to water for trapping residual solids in the water, said porous material being impregnated with diatomaceous earth,
   c. means mounting said bodies to cause water requiring to be filtered to pass first through said impregnated material and then through the activated carbon,
   d. and a layer of diatomaceous earth at a surface of said impregnated material remote from the activated carbon to trap bacteria at said layer and form a bio layer for the bacterial removal of further impurities from incoming water.

2. A polishing filter device for potable water comprising
   a. a hollow, elongate, perforated core of rigid material chemically inert to water,
   b. a body of activated carbon within said core,
   c. a body of porous mineral material chemically inert to water surrounding said core, said porous material being impregnated with diatomaceous earth,
   d. a layer of diatomaceous earth on the outer surface of said impregnated material,
   e. and means for causing water to flow inwardly towards said core sequentially through said layer and said body of porous material, and subsequently into and along said core in contact with the activated carbon therein.

3. A self-contained, disposable filter unit comprising a polishing filter device according to claim 2 and an elongate, water tight housing containing said filter device, said housing having inlet and outlet means for connecting the unit in a potable water supply to cause the water therein to flow through said filter device.

4. The invention of claim 2, wherein said porous mineral material is fiber glass.

5. The invention of claim 2, wherein said porous mineral material is asbestos.

* * * * *